US010223533B2

(12) United States Patent
Dawson (10) Patent No.: US 10,223,533 B2
(45) Date of Patent: Mar. 5, 2019

(54) SYSTEMS AND METHODS FOR ANALYSIS OF CROSS-SITE SCRIPTING VULNERABILITIES (71) Applicant: Veracode, Inc., Burlington, MA (US)

(72) Inventor: Isaac M. Dawson, Yokohama (JP)

(73) Assignee: Veracode, Inc., Burlington, MA (US)

( * ) Notice: Subject to any disclaimer, the term of this patent is extended or adjusted under 35 U.S.C. 154(b) by 289 days.

(21) Appl. No.: 14/519,511

(22) Filed: Oct. 21, 2014

(65) Prior Publication Data
US 2016/0110547 A1    Apr. 21, 2016

(51) Int. Cl.
G06F 21/57    (2013.01)
G06F 17/30    (2006.01)
H04L 29/06    (2006.01)

(52) U.S. Cl.
CPC ...... *G06F 21/577* (2013.01); *G06F 17/30864* (2013.01); *H04L 63/1433* (2013.01)

(58) Field of Classification Search
CPC ............ G06F 21/577; G06F 17/30864; H04L 63/1433
See application file for complete search history.

(56) References Cited

U.S. PATENT DOCUMENTS

| 8,949,992 | B2* | 2/2015 | Amit | G06F 21/563 |
| | | | | 713/187 |
| 9,317,694 | B2* | 4/2016 | Arbabi | G06F 21/577 |
| 9,805,203 | B2* | 10/2017 | Johns | G06F 21/577 |
| 2011/0321016 | A1* | 12/2011 | Haviv | G06F 11/3604 |
| | | | | 717/128 |
| 2012/0174229 | A1 | 7/2012 | Pistoia et al. | |
| 2013/0055397 | A1 | 2/2013 | Amit et al. | |
| 2013/0111594 | A1* | 5/2013 | Amit | G06F 21/52 |
| | | | | 726/25 |
| 2015/0163237 | A1* | 6/2015 | Pistoia | H04L 63/1433 |
| | | | | 726/25 |
| 2015/0264082 | A1* | 9/2015 | Belva | H04L 63/1466 |
| | | | | 726/25 |
| 2016/0179486 | A1* | 6/2016 | Sheth | G06F 8/427 |
| | | | | 717/144 |

OTHER PUBLICATIONS

K.K. Mookhey, Nilesh Burghate. "Detection of SQL Injection and Cross-site Scripting Attacks" Created Mar. 17, 2004, Updated Nov. 2, 2010 (7 pages) http://www.symantec.com/connect/articles/detection-sql-injection-and-cross-site-scripting-attacks.*

(Continued)

*Primary Examiner* — Joseph P Hirl
*Assistant Examiner* — Thomas A Gyorfi
(74) *Attorney, Agent, or Firm* — Gilliam IP (57) ABSTRACT A system for detecting XSS vulnerabilities includes determining the context in which a probe supplied as an input to a webpage or an application exists in a script associated with the webpage or application. A payload is generated based on, at least in part, the context such that during execution of the script, an executable code fragment in the payload can escape out of the context in which the probe exists and into a the global context of the script. The payload may include additional characters that prevent the payload from causing errors in the execution of the script.

20 Claims, 7 Drawing Sheets (56) References Cited

OTHER PUBLICATIONS

Chris Weber. "Testing Your Web Applications for Cross-Site Scripting Vulnerabilities" Published May 6, 2005 (4 pages) https://technet.microsoft.com/en-us/library/cc512662.aspx.*

"Testing XSS—Special Cases" Published Jun. 15, 2005 (4 pages) https://paladion.net/testing-xss-special-cases/.*

"Cross-site scripting (XSS) Tutorial: Learn About XSS Vulnerabilities, XSS Injections and How to Prevent Cross-Site Scripting Attacks" http://web.archive.org/web/20120504010215/https://www.veracode.com/security/xss.*

"Exploits of a Mom" XKCD comic strip originally published Oct. 10, 2007 (1 page) http://xkcd.com/327/.*

International Search Report and Written Opinion for International Patent Application No. PCT/US2015/056661 dated Jan. 19, 2016 (11 pages).

stackoverflow.com: "Could anyone explain these XSS test strings?", dated Aug. 23, 2014. Retrieved from the internet on Jan. 7, 2016: URL:http://stackoverflow.com/questions/25461418/could-anyone-explain-these-xss-test-strings, (2 pages).

Lekies, Sebastian, et al. (2013) "25 Million Flows Later—Large-scale Detection of DOM-based XSS", In Proceedings of the 2013 ACM SIGSAC conference on Computer & communications security (CCS '13), ACM, pp. 1193-1204.

\* cited by examiner

FIG. 1

```
if (true_statement) {
    // These instructions will be executed
} else {
    // These instructions will not be executed
    [PROBE];
}
```

FIG. 2A

```
if (true_statement) {
    // These instructions will be executed
} else {
    // Alert will be executed
    } alert(1);{;
}
```

FIG. 2B

```
if (true_statement) {
  // These instructions will be executed
} else {
  // These instructions will not be executed
  if (another_true_statement) {
     // These instructions will also not be executed
  } else {
   // These instructions will not be executed
   [PROBE];
  }
}
```

FIG. 2C

```
if (true_statement) {
  // These instructions will be executed
} else {
  // These instructions will not be executed
  if (another_true_statement) {
     // These instructions will not be executed
  } else {
   // Alert will be executed
   }}alert(1){{;
  }
}
```

FIG. 2D

```
// this function is never called
function x() {
    var product = 'PROBE';
}
```

FIG. 3A

```
// this function is never called
function x() {
    var product = '[';}alert(1);{//]';
}
```

FIG. 3B

```
    var product = 'PROBE';
```

FIG. 3C

```
    var product = '';alert(1);'';
```

FIG. 3D

```
    var product = '\';alert(1);\'';
```

FIG. 3E

```
    var product = '\\';alert(1);//';
```

FIG. 3F

```
var id = PROBE;
```

FIG. 4A

```
var id = 0;alert(1);
```

FIG. 4B

```
var id = PROBE + x / 20;
```

FIG. 4C

```
var id = 0;alert(1);0 + x / 20;
```

FIG. 4D

```
function add(x,y) {
  var z = x + y;
  return z;
} add(PROBE,4);
```

FIG. 5A

```
1,2,3,4);alert(1); (1 add(1,2,3,4);alert(1);(1,4);
```

FIG. 5B

```
function full_name(first,last) {
  return first + " " + last;
} full_name("PROBE","Doe");
```

FIG. 5C

```
",1);alert(1);("

full_name("",1);alert(1);("","Doe");
```

SYSTEMS AND METHODS FOR ANALYSIS OF CROSS-SITE SCRIPTING VULNERABILITIES

FIELD OF THE INVENTION

This invention relates generally to systems and techniques for analyzing computer code, and more particularly to determining whether the computer code is vulnerable to cross-site scripting.

BACKGROUND

In general, Cross-site Scripting, (also known as XSS), is a type of web application security vulnerability that allows an attacker to add malicious code to an application that can then execute in a user's browser or on a user's device. In XSS attacks, the victim is typically the user (i.e., a person visiting an affected webpage or executing an affected application), rather than the application or the website itself. Typically, XSS attacks target client-side rendering and scripting languages such as HTML and JavaScript to embed a malicious script in a webpage or an application. These attacks can execute any time the webpage is loaded into a user's browser, an affected application is executed on the user device, or when the user interacts with the webpage and/or application. Common outcomes of XSS attacks include browser session hijacking, stealing account credentials, displaying unwanted advertisements, and infecting the user device with a virus or other malware. The most malevolent XSS attacks can also access unrelated resources on the user device, web applications, and other networked resources, otherwise protected by the user's firewall. This is feasible because the user unknowingly permitted execution of the affected code within a trusted location (e.g., on the user device) behind the firewall.

A cross-site scripting vulnerability generally arises because many applications are designed to accept data from users and to dynamically include the received data in the application without first properly validating the received data. Three different types of cross-site scripting attacks, reflective, persistent, and DOM-based, are common. In a reflective attack, while interacting with an application (usually a web application), the user sends a request to a server, such as submitting an HTTP form. The application then responds with a page containing an echo of what the user submitted, for confirmation. Applications/web apps with XSS vulnerabilities allow potentially harmful instructions and/or data to be inserted during such transactions. For example, a malicious string of JavaScript can replace or append itself to the user supplied data. As the application executes and/or the webpage is displayed, echoing the user supplied data, the malicious code may execute on the user device.

In a persistent attack, an application, such as that provided by a web server, often stores user-supplied data without properly securing such data. In a subsequent access to a webpage served by the web server or while executing an application that accesses any stored data, the previously stored data, which can include harmful instructions, are sent to a user device via a browser and/or the application accessing the data. This kind of XSS attack is generally more dangerous because the user-supplied data is not properly sanitized before the application and/or webpage using such data are accessed by later uses. The malicious code stored by the attacker executes when a later user executes or interacts with the application and/or webpage and, as such, any later user of the application/webpage can potentially become a victim.

In one example, a JavaScript code fragment is input as part of the attacker's user name to be displayed on a user profile page. Here, a fraudulent user exploits the fact that the application receiving the input stores each user name in a local database and fails to sanitize the name field, i.e., fails to check for any vulnerabilities therein. When other users view the attacker's profile page, the code stored masquerading as the user name may be executed on the other users' devices without consent or even knowledge of the other users. Such code can be malicious, e.g., it can damage the users' devices and/or access the users' protected information without authorization.

In DOM-based XSS attacks, the attacker can exploit the Document Object Model (DOM) standard that enables application program interface (API) access to the contents of documents such as HTML and XML documents. Some applications deliver webpages and other applications that contain user-side scripts that dynamically generate application and/or webpage content without accessing a web server or another computer. According to a certain user input, these applications/webpages can modify the application/webpage content, including instructions and data, without any interaction with another computer. In a DOM-based XSS attack, the attacker can inject malicious script into an application or a webpage without any data being submitted to the server, exploiting security vulnerabilities in a client-side script and/or application.

In order to prevent or at least mitigate XSS attacks, it is beneficial to analyze and/or test webpages, server-side code and executables, and client-side code such as scripts. To this end, various known analysis and testing techniques generally apply a number of preconfigured payloads (e.g., pieces of executable code) to the object under test, i.e., a webpage, server-side code/executable, or client-side code. An XSS vulnerability in the target is detected if the payload succeeds, i.e., the payload is executed during testing. Typically, however, a large number of payloads that are applied do not succeed and, as such, the testing consumes a long time—usually several hours, if there are a large number of input vectors (i.e., parameters dependent on user input). In addition, a payload that can succeed may not be preconfigured. As such, even after spending a significant time and effort in testing, a particular XSS vulnerability may remain undetected.

SUMMARY

According to various embodiments of the invention, the methods and supporting systems described herein facilitate determination of XSS vulnerabilities in software code in an efficient manner. This is achieved, in part, by determining a context of an executable component, such as a script, in which an attack payload may exist. The context is then analyzed and, based on one or more characteristics of the context, a payload that can execute without causing errors in the execution of the executable component is generated. The software code can then be tested in a targeted manner for the generated context-dependent payload. This can increase the likelihood of detecting a potentially malicious XSS payload, while minimizing testing of payloads to which the software code is not likely vulnerable.

Accordingly, in one aspect, a method of detecting a cross-site scripting (XSS) vulnerability includes identifying by a processor a script element within which a probe/ payload exists. In general, a probe/payload is an input received by an application and/or a webpage associated with the script element. The method includes analyzing by the processor the script element to determine a context in which the probe/payload exists. The method also includes generating by the processor a payload that is configured to escape out of the context in which the probe/payload exists into a global context of the script where the payload is executable. The payload also includes one or more characters determined according to the context in which the probe/payload exists, such that the characters prevent introduction of errors by the payload during execution of the script. An XSS vulnerability in the script element may be exposed by such a payload, thus facilitating the detection of the vulnerability. The script element may include a JavaScript code element.

In some embodiments, identifying the script element includes supplying the probe/payload as an input to a document. A portion of the document in which the probe/payload is located may be identified in response to the supplied input. Identifying the script element may also include ascertaining that the portion of the document is associated with a script, and designating the portion of the document as the script element.

In some embodiments, the document includes a webpage, and the method further includes crawling a number of webpages, and designating a webpage configured to receive an input as the document. The webpage designated as the document may be configured to receive the input via a form. Analyzing the script element may include generating, by parsing contents of the script element, a syntax tree model of the script element. This analysis can be used in determining the context in which the probe/payload exists. The context in which the probe/payload exists may include at least one of: a variable assignment, an integer assignment, a function definition, and a function argument.

In some embodiments, the context includes a nested structure, and generating the payload includes determining a number N, indicative of a number of structures forming the nested structure. In these embodiments, generating the payload also includes providing, in order, N context closing elements, a function that can execute to expose a vulnerability, and N context opening elements. The nested structure can include a nested if-then-else structure.

In some embodiments, the context includes a variable assignment within a function, and the variable assignment includes a string literal that includes the probe/payload. In these embodiments, generating the payload includes providing, in order: (i) a dummy string, (ii) a string literal closing element, (iii) a context closing element resulting in closing the function context, (iv) a function that can execute to expose a vulnerability, (v) a context opening element, and (vi) a comment element, resulting in masking a string literal closing element in the variable assignment. The string literal closing element may be a single quote or a double quote.

In some embodiments, the context includes an integer assignment that includes the probe/payload, and generating the payload includes providing, in order: (i) a dummy integer, (ii) a context closing element resulting in closing the integer assignment context, and (iii) a function that can execute to expose a vulnerability. The context may also include a function call that includes the probe/payload, and generating the payload includes providing, in order: (i) several integers, where the number of integers is greater than or equal to a number of arguments associated with the function, (ii) an element closing the function call, (iii) a function that can execute to expose a vulnerability, and (iv) an element opening the function call. In various embodiments, the one or more characters preventing introduction of errors by the payload during execution of the script include a context opening character corresponding to a context closing character associated with the context in which the probe/payload exists, and a statement. The statement may not invoke any function or provide a value to any variable.

In another aspect, a system for detecting XSS vulnerabilities includes a first processor and a first memory coupled to the first processor. The first memory stores therein instructions which, when executed by a processing unit coupled to a memory module, program the processing unit to perform various tasks identified below. The processing module may include the first processor and/or a second processor, and the memory module may include the first memory and/or a second memory. The instructions may be received at the second memory through a network, such as the Internet. The instructions may then be stored in the second memory so as to program the processing unit to perform the tasks described below.

In some embodiments, the processing unit is programmed to identify a script element within which a probe/payload exists, and to analyze the script element to determine a context in which the probe/payload exists. In addition, the processing unit is programmed to generate a payload that is configured to escape out of the context in which the probe/payload exists into a global context of the script where the payload is executable. The payload is generated by including therein one or more character determined according to the context in which the probe/payload exists. The one or more characters are selected to prevent introduction of errors by the payload during execution of the script. The processing unit thus programmed can detect an XSS vulnerability in the script element.

In some embodiments, to identify the script element, the first memory further includes instructions which program the processing unit further to supply the probe/payload as an input to a document. The processing unit is also programmed to identify a portion of the document in which the probe/payload is located, in response to the supplied input. In addition the processing unit is programmed to ascertain that the portion of the document is associated with a script, and to designate the portion of the document as the script element.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals generally refer to the same or similar elements. In different drawings, the same or similar elements may be referenced using different reference numerals. The drawings are not necessarily to scale, emphasis instead being placed upon illustrating aspects of the invention. In the drawings.

DETAILED DESCRIPTION

Figure 1:
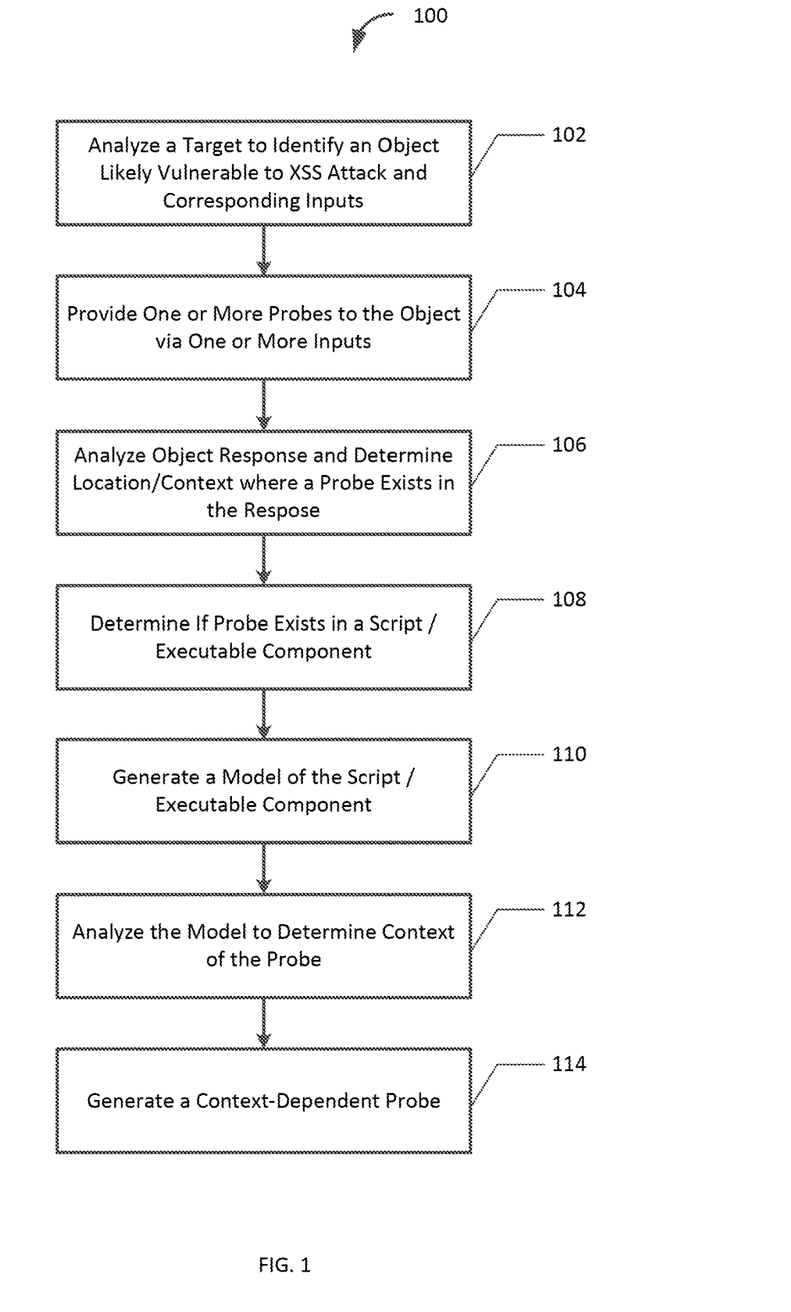
FIG. 1 illustrates a process of generating a context-dependent payload, according to one embodiment.

With reference to FIG. 1, in a process 100, a target (e.g., a web site) is analyzed in step 102, e.g., using an automated crawling mechanism, to identify objects such as webpages, applications, etc., and their potential inputs. In some embodiments, an application can be received and analyzed by a processor to identify potential inputs thereof, in the step 102. After a webpage/application that accepts input, such as an HTML form, is identified, several probes are provided as input values to the webpage/application (e.g., the identified form), in step 104. In step 106, locations in the response by the application, the webpage server, and/or the client-side system, where the probes may exist are identified. Such response typically includes HTML documents that include code and/or scripts. A response may include other types of documents, e.g., XML documents. The code/scripts may be provided in any language such as Java, C, C++, JavaScript, Python, Ruby, etc.

In step 108, it is determined whether the probes exist within a script element, e.g., a JavaScript code element. The content of the script element, if it includes the probe, is analyzed using a parser (e.g., a JavaScript parser if the script is written in JavaScript), and a syntax tree model of the script is generated in step 110. In step 112, the syntax tree is traversed to identify the context in which the probe exists. Examples of the context include variable assignment, function/method argument, integer assignment, function/method definition, etc. Once the context is identified, a unique attack payload is generated in step 114 to ascertain if it is possible to escape out of the identified context, which can be nested, into the global context of the script, where the payload can then be executed. The payload generation is based on the identified context where the probe was located. Such a payload will likely be executed regardless of the original injection point, i.e., where the probe was inserted in the response of the application, webserver, or client-side system. In some embodiments, once a payload that can escape to the global context is generated, a test is developed to detect such payloads and exclude them as part of sanitizing. The detection may be performed at the webserver/application etc. This way, the systems and methods described herein can be used to build effective sanitizers/filters, that can minimize the XSS vulnerability.

Figure 2A:
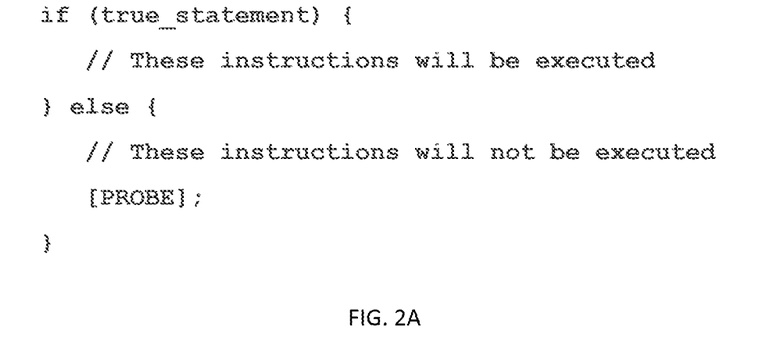
FIGS. 2A-2B depict one example of the "if-then-else" context, and the corresponding payload, according to one embodiment.

To maximize the likelihood that a probe/payload can cause the flow of instructions executed by the processor to escape out of the present context (i.e., the context where the probe was located) so that the instructions in the probe/payload (which can be harmful, if the probe/payload is provided by an attacker) will be executed in the global context, various probes may be constructed by taking into account the present context of the probe. In one embodiment, it is determined that the probe was located in the "else" portion of an "if-then-else" context of a script, as depicted in FIG. 2A. In particular, the "if" condition is a true condition and, hence, the probe located in the "else" sub-context will not be encountered during normal, conventional testing of the script. Any XSS vulnerability in the script, therefore, will likely not be detected via conventional testing of the script. In various instances, the "if" condition may be true in most but not all cases. After executing a particular flow (e.g., click a button, fill out a form, click another button, etc.) the "else" statement may be executed. In some cases the probe is located in dead code, i.e., a portion of the code that does not execute, but the application still echoes the statements associated with the dead code, which may allow any malicious code therein to execute.

Figure 2B:
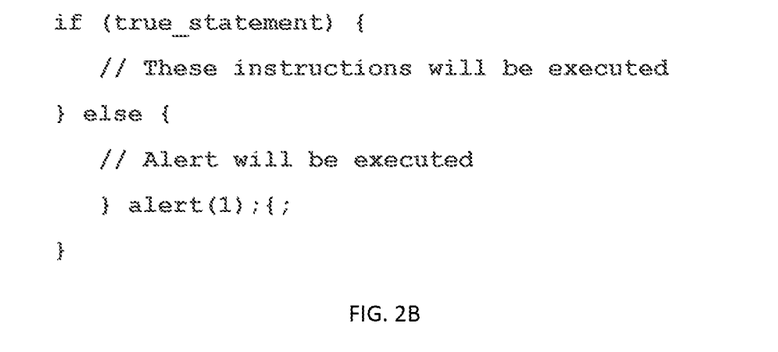

In order to expose such XSS vulnerability, the context is identified as "if-then-else" context by traversing a syntax tree of the script. A payload is then designed to close out the else statement so as to bring any subsequent code into the higher-level context. If the parent of the "if-then-else" context is the global context, the subsequent code will execute in the global context. For example, as depicted in FIG. 2B, the payload "} alert(1); {;" starts with a closing curly brace which closes out the "else" scope. The code statement "alert(1);" can then execute in the global context. Thereafter, the code segment "{;" in the payload in combination with the closing curly brace in the original script immediately after the payload avoids any syntax or parsing errors that may be otherwise introduced in the execution of the script. The code associated with the statement "alert(1);" can thus be executed on the user device. One advantage of determining a payload described above to then test this portion of the code for a pattern according to the determined payload (i.e., "} some_code; {;") because "some_code" can be potentially a harmful XSS payload. Testing using the context-based payload can thus expose an XSS vulnerability.

Figure 2C:
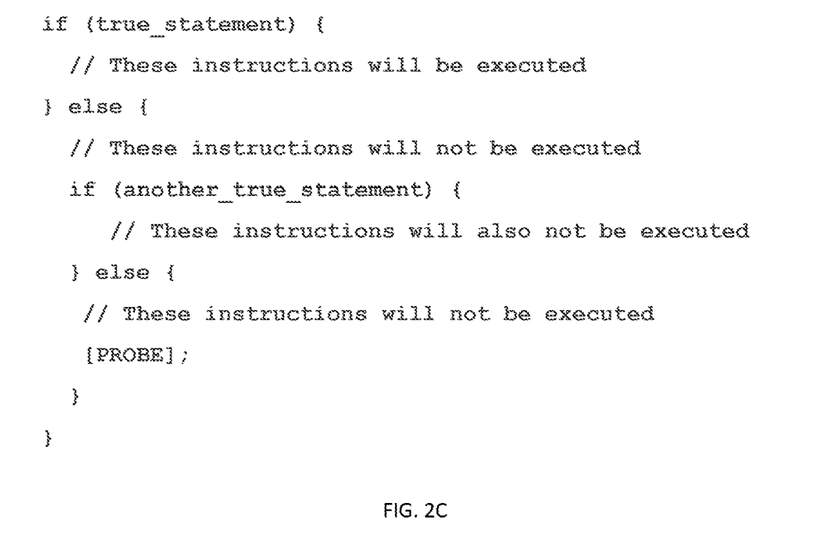
FIGS. 2C-2D depict another example of the "if-then-else" context, and the corresponding payload, according to one embodiment.

In some embodiments, context determination includes identifying the level of a structure in which the probe is located, if the structure is part of a nested structure, such as a nested "for" loop, a nested "while" loop, a nested "if-then-else" structure, etc. For example, with reference to FIG. 2C, the probe is located in the "else" context of the inner "if-then-else" structure within a nested "if-then-else" structure. As such, the level of the "else" context in which the probe exists is determined to be two. It should be understood that a two-level nesting is illustrative only and that in general, the level of the context in which the probe is located can be 3, 5, 10, 16, etc., and depends on the total depth of the nested structure. In the example depicted in FIG. 2C, a context-dependent payload that can escape to the global context, where the code in the probe can be executed without later causing parser errors, starts with two closing braces, as depicted in FIG. 2D.

Figure 2D:
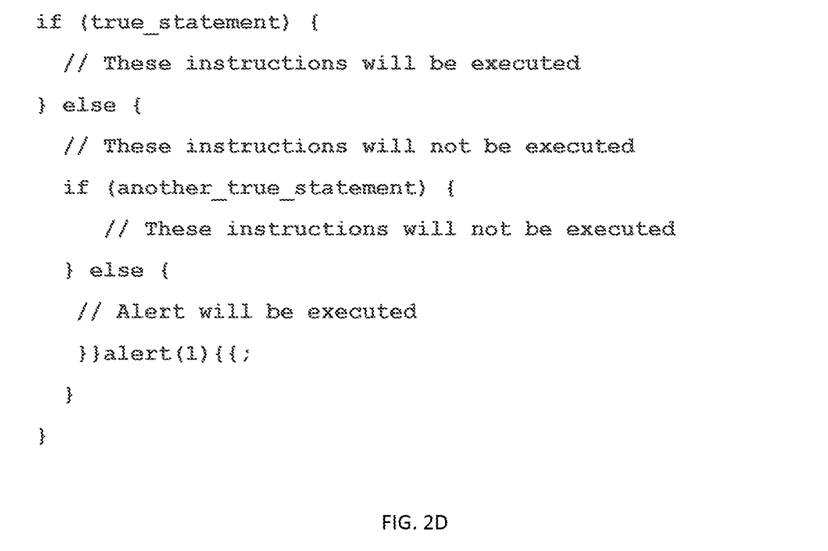

An advantage of generating a payload such as that described with reference to FIG. 2D is to then test at least a portion of the code for a pattern according to the generated probe (e.g., "}} some_code; {;") because "some_code" can be potentially a harmful XSS payload. This test is similar to the previous one described with reference to FIGS. 2A and 2B, but a subtle and important difference is checking for two closing curly braces as opposed to one in the previous example. The determination of the probe's context and generation of a context-based payload enables generating payloads that have such subtly different but important features and, hence, are more likely to succeed than randomly generated or preconfigured payloads.

Figure 3A:
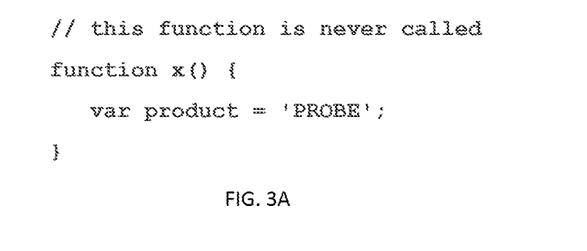
FIGS. 3A-3B depict an example of the string literal assignment context within a function context, and the corresponding payload, according to one embodiment.
Figure 3B:
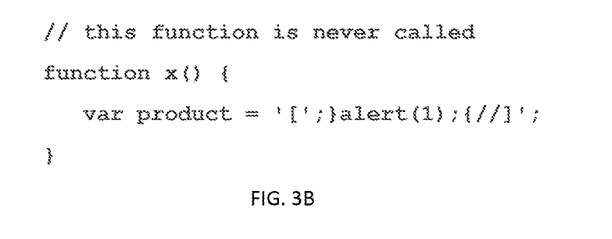

In some embodiments, a probe may be located in an assignment statement. FIG. 3A, for example, depicts an assignment of a probe as a string literal in the body of function "x( )" that is not invoked, i.e., the portion of the code in which the probe is located is dead code. The context of this probe is the assignment in a function. As depicted in FIG. 3B, if the payload of the probe includes a dummy assignment such as "'[';" the assignment statement "var product='[';" will be parsed without any parsing error. A closing brace "}" after the dummy assignment will close the function context so that the subsequent code, which can be malicious, can execute in the global context. To illustrate, FIG. 3B depicts an executable statement "alert(1);" that can inform a tester of a potential XSS vulnerability.

The original code, into which the probe was located, included a closing brace to close the context of the function "x( )" Recall that the payload of the probe already closed the context of the function "x( )" so that the subsequent executable portion of the payload can execute in the global context. As such, the original closing brace is now redundant and can generate a parsing error during execution of the script. The attackers generally design the probes to avoid such errors because these errors can prevent the malicious code from executing and/or may expose the existence of such malicious code.

Therefore, in various embodiments, the payload is generated to avoid parsing errors as well. For example, after the statement "alert(1);" the payload may include an opening brace followed by a comment indicator "//" and a dummy character "]." The opening brace will open a new context in the global context, and the comment indicator "//" will cause the string literal closing character "'" in the original code to be treated as a comment. The original closing brace "}" will then close out the new context created by the payload, thus avoiding a parsing error. During testing, a test that searches for a pattern according to the payload depicted in FIG. 3B can detect the XSS vulnerability described above with reference to FIG. 3A. FIG. 3A depicts string literal assignment using single quotes, but the corresponding payload generation can be employed to generate a payload if string literal assignment statement uses double quotes.

Figure 3C:
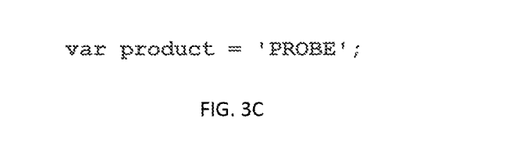
FIGS. 3C-3D depict an example of the string literal assignment context, and the corresponding payload, according to one embodiment.
Figure 3D:
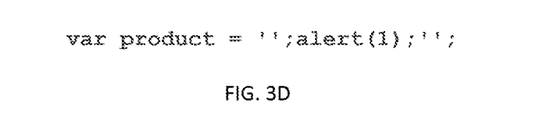

In some embodiments, a probe may located in a string literal assignment statement outside the function context, as depicted in FIG. 3C. In this case, the context of the probe is assignment. As depicted in FIG. 3D, a payload can simply close the string literal assignment using, for example, "';" followed by an executable statement (or sequence of statements), such as "alert(1);" that can inform a tester of a vulnerability in the script. After the executable statements in the payload, a character that marks the beginning of the string to be assigned, such as a single quote or double quote, is provided to match the corresponding character that marked the end of the string literal in the original script, so as to avoid parsing errors.

Figure 3E:
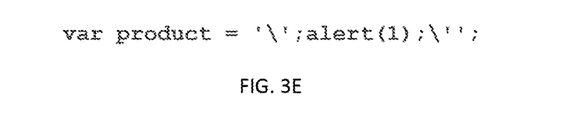
FIGS. 3E-3F depict another example of the string literal assignment context, and the corresponding payload, according to one embodiment.
Figure 3F:
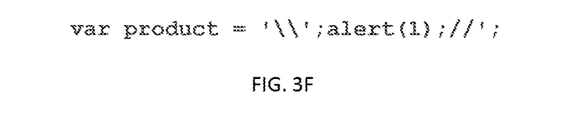

In some instances, the execution of a script that includes a probe involves escaping any single quote and/or double quote characters, for example, using an escape character such as backslash. If such escaping is employed, a probe containing a payload depicted in FIG. 3D would result in a string literal assignment depicted in FIG. 3E. Specifically, as the single quotes in the payload are escaped, the payload does not escape out of the assignment context into to the global context and, as such, the executable statement in the payload will not execute. The developer of the script execution environment may not escape the escape characters, however, and an attacker can exploit this vulnerability. To expose such a vulnerability, a payload "\';alert(1);//'"can be generated. During execution of the script, the single quotes would be replaced by "\'" resulting in the assignment depicted in FIG. 3F. According to this payload, the variable "product" would be assigned the value backslash ("\") and the following executable statement would escape out of the assignment context into the global context. The executable statement can then execute in the global context and can expose the XSS vulnerability. After the "alert(1);" statement the payload comments out the remainder of the assignment statement, thus avoiding a parser error.

Figure 4A:
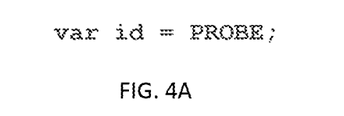
FIGS. 4A-4D depict examples of the integer assignment context, and the corresponding payloads, according to two different embodiments.
Figure 4B:
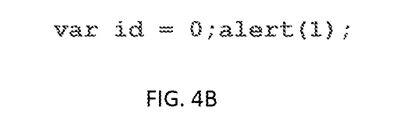
Figure 4C:
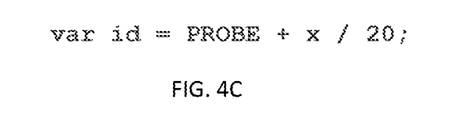
Figure 4D:
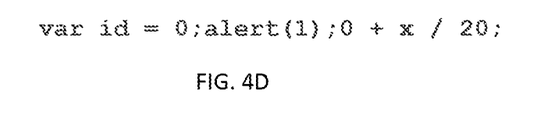

With reference to FIGS. 4A and 4B, if the context of the probe is integer assignment, a payload that includes a dummy integer assignment such as "0;" followed by an executable statement such as "alert(1)" can expose a vulnerability in the integer assignment. FIG. 4C depicts an integer assignment that includes mathematical operations associated with the probe. In this situation, an additional dummy value, such as the value "0" before the "+" operator as depicted in FIG. 4D, may be provided so as to avoid parser errors. It should be understood that the dummy assignments of "0" are illustrative only and that several other integers can also be used in generating the payload. Also, if the context is determined to be the assignment of a real number or another data type, a dummy real number or a dummy value of the identified data type can be used in generating the payload. In general, a dummy value is generated for each operator in the assignment context.

Figure 5A:
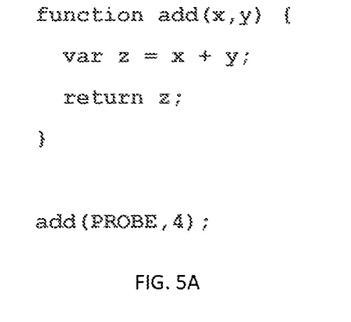
FIGS. 5A-5D depict examples of the function call context, and the corresponding payloads, according to two different embodiments.

In some situations, a probe is located within a function call, as a function argument. With reference to FIG. 5A, for example, a probe "PROBE" is located in the function call "add (PROBE, 4);" An example of the body of the function add is also depicted in FIG. 5A. In this example, the context of the probe is function call. Several languages, and JavaScript in particular, do not permit passing fewer arguments in the function call than those required by the function, but do permit passing more than the required number of arguments. As such, a payload likely to be successful in executing a malicious code may include several arguments. In general, these arguments can be integers.

Figure 5B:
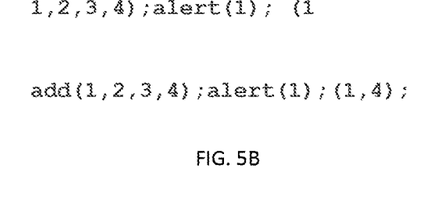

For example, as depicted in FIG. 5B, the payload "1,2,3,4);alert(1); (1" can generate a function call "add (1, 2, 3, 4);" that may not produce any parser errors. The closing parenthesis followed by the semicolon closes the function call context and, as such, the executable code "alert(1);" included in the payload can execute in the root/global context. The remainder of the payload "(1" in combination with the code ", 4);" in the original script generates the code "(1, 4);" which typically does not produce any parser errors, allowing the executable portion of the payload to execute in the root/global context. The testing procedure can test for the above described sequence to detect for the XSS vulnerability in a function call.

Figure 5C:
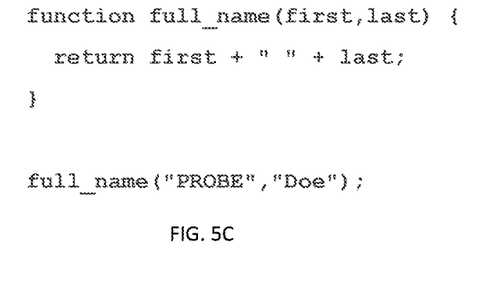
Figure 5D:
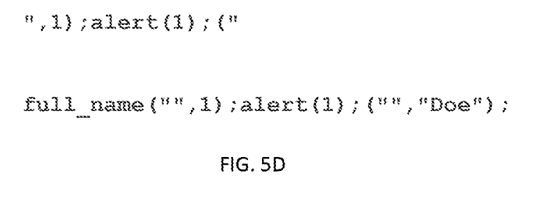

In some embodiments, the number of arguments of the function is determined if the context of the payload is determined to be a function call. Dummy arguments exactly equal to the number of arguments in the function are then generated while generating the payload. This is illustrated with reference to FIGS. 5C and 5D, where payload can be generated to detect XSS vulnerabilities in codes where the probe is located in a call to a function that has string arguments. Specifically, the function "full_name" has two string arguments, namely, "first" and "last." The probe was located in the function call context. As depicted in FIG. 5D, a payload is generated by closing the first string argument with a double quote character. The first argument passed to the function is therefore an empty string. In other embodiments, additional integer arguments, namely "1," "2," and "3," may be passed if the payload generation module does not know the exact number of function arguments and types thereof. Passing integers usually does not generate parser errors. The close parenthesis followed by the semicolon closes the function call context and, as such, the executable code in the payload "alert(1);" can execute in the global context. The remainder of the payload "("" forms the statement "("","Doe");" which can be processed without generating parser errors. As before, the testing procedure can test for the above described sequence in the payload to detect for the XSS vulnerability in a function call.

It should be understood that the arguments "1," "2," "3," and "4" depicted in FIG. 5B and the arguments "","" and "1" depicted in FIG. 5D are illustrative only, and that other values can be used in generating the payload. The values can also be real numbers, characters, strings, etc., and need not necessarily be integers. Also, the number of arguments 4 in FIG. 5B is illustrative only. In various embodiments, payloads can be generated to include fewer or more arguments. If the number of arguments is not less than the number of arguments required by the function, the likelihood that the payload will generate a parser error is minimized.

Figure 6:
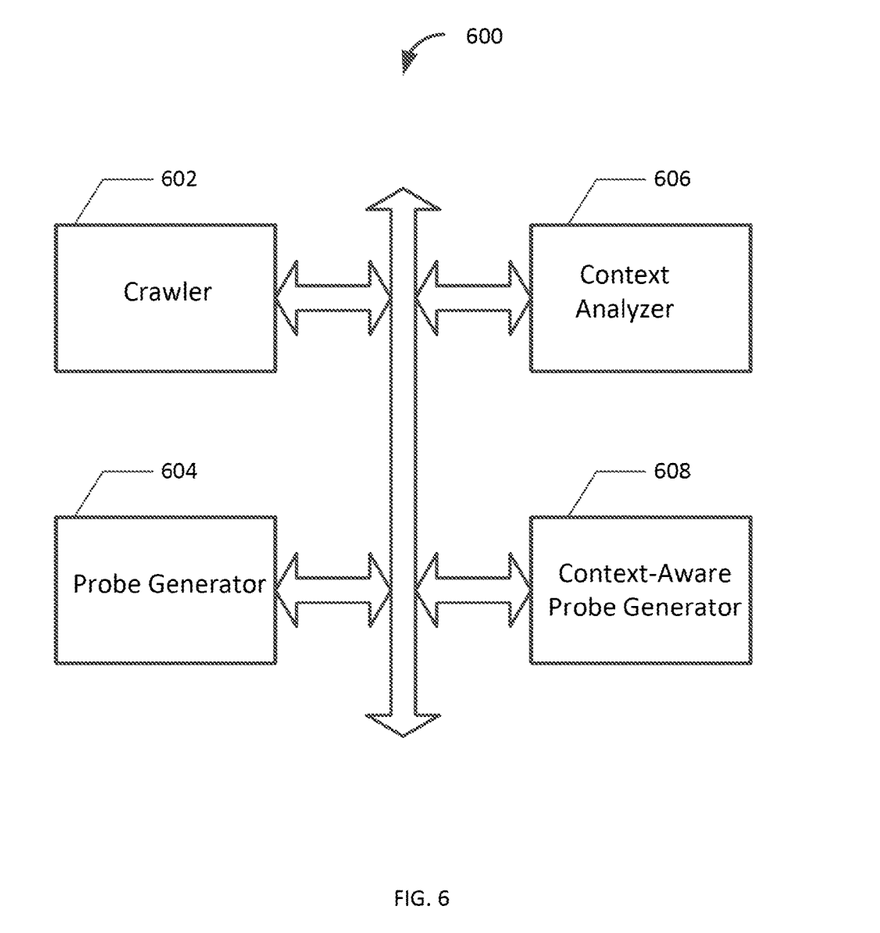
FIG. 6 depicts a system for generating a context-based probe/payload, according to one embodiment.

With reference to FIG. 6, in a system 600 a crawler 602 analyzes a target website to identify webpages that accept user inputs. The type of input or inputs accepted by each of the identified webpages is also determined by the crawler 602. A probe generator 604 then sends several probes as inputs to one or more webpages, and a context analyzer 606 receives and analyzes the response from the webpage. In particular, the context analyzer 606 determines if the probe exists within a script (such as an HTML script) and parses the script to determine the context in which the probe exists. A context-aware probe generator 608 then generates a context-based payload, as described above, that is likely to succeed, i.e., an executable code included in the context-based payload is likely to escape out of the context where the original probe was identified and is likely to execute in the global context of the script. It should be understood that each of the components of the system 600 can be implemented as one or more separate software modules executing on one or more processors. Alternatively, any two or more components can be implemented by a single processor or server.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/ processing element instructions can be divided amongst such single or multiple processor/devices/ processing elements.

The device(s) or computer systems that integrate with the processor(s)/ processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/ processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, I claim:

1. A method comprising:
supplying to a target an input that comprises a first probe;
based on a response that includes the first probe within a script element, generating a syntax tree model from the script element;
determining a context in which the first probe exists within the script element based on the syntax tree model;
generating an attack payload to detect vulnerability of the target to escape out of the context; and
supplying the attack payload to the target.

2. The method of claim 1, further comprising:
determining that the response includes the first probe;
identifying a location of the first probe within the response; and
determining that the location is associated with the script element, wherein generating the syntax tree model is based on the determination that the first probe is at the location associated with the script element.

3. The method of claim 1, further comprising:
crawling a website to determine a plurality of webpages that accept input, wherein the plurality of webpages includes the target;
generating a second probe in addition to the first probe;
supplying to the plurality of webpages inputs comprising the first and the second probes, which includes supplying the input to the target;
based on a second response that includes the second probe within a second script element, generating a second syntax tree model from the second script element;
determining a second context in which the second probe exists within the second script element based on the second syntax tree model;
generating a second attack payload to detect vulnerability of the website to escape out of the second context; and
supplying the second attack payload to the website.

4. The method of claim 1, wherein the context in which the first probe exists comprises at least one of: a variable assignment, an integer assignment, a function definition, an if-then-else structure, a nested structure, and a function argument.

5. The method of claim 1, wherein generating the attack payload comprises:
determining a number N, wherein N is indicative of a number of structures within which the context is nested, wherein determining the context comprises determining that the context is a nested structure; and
generating the attack payload with, in order, N context closing elements, a function for reporting vulnerability, and N context opening elements.

6. The method of claim 1, wherein generating the attack payload to detect vulnerability of the target to escape out of the context comprises generating the attack payload to detect vulnerability of the target to escape out of the context to a global context of the target.

7. The method of claim 1, wherein generating the attack payload comprises generating the attack payload with a set of one or more escape characters to escape the determined context to a global context of the target and with a function to report the vulnerability.

8. The method of claim 1, wherein generating the attack payload to detect vulnerability of the target to escape out of the context comprises generating the attack payload to detect vulnerability of the target to escape out of the context and to avoid parsing errors when the script element is executed with the attack payload.

9. A system comprising:
a processor; and
a storage medium comprising instructions executable by the processor to cause the system to,
supply to a target an input that comprises a first probe;
based on a first response that includes the first probe within a first script element, generate a first syntax tree model from the first script element;
determine a first context in which the first probe exists within the first script element based on the first syntax tree model;
generate a first attack payload to detect vulnerability of the target to escape out of the first context; and
supply the first attack payload to the target.

10. The system of claim 9, further comprising instructions executable by the processor to cause the system to:
determine that the first response includes the first probe;
identify a location of the first probe within the first response; and
determine that the location is associated with the first script element, wherein the instructions to generate the first syntax tree model comprise the instructions to generate the first syntax tree model based on a determination that the first probe is at the location associated with the first script element.

11. The system of claim 9, further comprising instructions executable by the processor to cause the system to:
crawl a website to determine a plurality of webpages that accept input, wherein the plurality of webpages includes the target;
generate multiple probes, wherein the instructions to generate multiple probes include the instructions to generate the first probe;
supply to the plurality of webpages inputs comprising the multiple probes, wherein the instructions to supply to the plurality of webpages the inputs comprise the instructions to supply the input to the target;
based on each response that includes at least one of the multiple probes within a script element, generate syntax tree models from the script elements of the responses, wherein the instructions to generate the syntax tree models comprise the instructions to generate the first syntax tree model;

for each of the syntax trees models, determine a context in which a corresponding one of the multiple probes exist within a corresponding one of the script element based on the syntax tree model, wherein the instructions to determine the context comprise the instructions to determine the first context;

for each of the determined contexts, generate an attack payload to detect vulnerability of the website to escape out of the context, wherein the instructions to generate the attack payload comprise the instructions to generate the first attack payload; and supply the attack payloads to the website, wherein the instructions to supply the first attack payload comprise the instructions to supply the first attack payload.

12. The system of claim 9, wherein the first context in which the first probe exists comprises at least one of: a variable assignment, an integer assignment, a function definition, an if-then-else structure, a nested structure, and a function argument.

13. The system of claim 9, wherein the instructions to cause the system to generate the first attack payload comprise instructions executable by the processor to cause the system to:

determine a number N, wherein N is indicative of a number of structures within which the context is nested, wherein the instructions to determine the first context comprise instructions executable by the processor to cause the system to determine that the first context is a nested structure; and generate the first attack payload with, in order, N context closing elements, a function for reporting vulnerability, and N context opening elements.

14. The system of claim 9, wherein the instructions executable to cause the system to generate the first attack payload to detect vulnerability of the target to escape out of the context comprise instructions executable by the processor to cause the system to generate the first attack payload to detect vulnerability of the target to escape out of the context to a global context of the target.

15. The system of claim 9, wherein the instructions executable to cause the system to generate the first attack payload comprise instructions executable by the processor to cause the system to generate the first attack payload with a set of one or more escape characters to escape the determined first context to a global context of the target and with a function to report the vulnerability.

16. The system of claim 9, wherein the instructions executable to cause the system to generate the first attack payload to detect vulnerability of the target to escape out of the first context comprise instructions executable by the processor to cause the system to generate the first attack payload to detect vulnerability of the target to escape out of the first context and to avoid parsing errors when the first script element is executed with the first attack payload.

17. A processor-readable storage medium comprising instructions executable by the processor to:

supply to a target an input that comprises a first probe, based on a response that includes the first probe within a script element, generate a syntax tree model from the script element, determine a context in which the first probe exists within the script element based on the syntax tree model, generate an attack payload to detect vulnerability of the target to escape out of the context, and supply the attack payload to the target.

18. The processor-readable storage medium of claim 17, further comprising instructions to:

determine that the response includes the first probe;

identify a location of the first probe within the response; and determine that the location is associated with the script element, wherein the instructions to generate the syntax tree model comprise the instructions to generate the syntax tree model based on the determination that the first probe is at the location associated with the script element.

19. The processor-readable storage medium of claim 17, wherein the instructions to generate the attack payload comprise instructions to generate the attack payload to detect vulnerability of the target to escape out of the context to a global context of the target.

20. The processor-readable storage medium of claim 17, wherein the instructions to generate the attack payload comprise instructions to:

crawl a website to determine a plurality of webpages that accept input, wherein the plurality of webpages includes the target;

generate multiple probes, wherein the instructions to generate multiple probes include the instructions to generate the first probe;

supply to the plurality of webpages inputs comprising the multiple probes, wherein the instructions to supply to the plurality of webpages the inputs comprise the instructions to supply the input to the target;

based on each response that includes at least one of the multiple probes within a script element, generate syntax tree models from the script elements of the responses, wherein the instructions to generate the syntax tree models comprise the instructions to generate the first syntax tree model;

for each of the syntax trees models, determine a context in which a corresponding one of the multiple probes exist within a corresponding one of the script element based on the syntax tree model, wherein the instructions to determine the context comprise the instructions to determine the first context;

for each of the determined contexts, generate an attack payload to detect vulnerability of the website to escape out of the context, wherein the instructions to generate the attack payload comprise the instructions to generate the first attack payload; and supply the attack payloads to the website, wherein the instructions to supply the first attack payload comprise the instructions to supply the first attack payload.

* * * * *